(12) United States Patent
Kim et al.

(10) Patent No.: US 9,802,150 B2
(45) Date of Patent: Oct. 31, 2017

(54) CARBON DIOXIDE ABSORBENT BASED ON AMINE HAVING NITRILE FUNCTIONAL GROUP, AND CARBON DIOXIDE ABSORPTION METHOD AND SEPARATION METHOD USING SAME

(71) Applicant: UNIVERSITY-INDUSTRY COOPERATION FOUNDATION OF KYUNG HEE UNIVERSITY, Gyeonggi-do (KR)

(72) Inventors: Hoon Sik Kim, Seoul (KR); Young-Seop Choi, Seoul (KR); Youngeun Cheon, Gyeonggi-do (KR); Heehwan Kim, Seoul (KR)

(73) Assignee: University-Industry Cooperation Foundation Of Kyung Hee University, Gyeonggi-Do (KR)

( * ) Notice: Subject to any disclaimer, the term of this patent is extended or adjusted under 35 U.S.C. 154(b) by 189 days.

(21) Appl. No.: 14/758,757

(22) PCT Filed: Dec. 27, 2013

(86) PCT No.: PCT/KR2013/012268
§ 371 (c)(1),
(2) Date: Jun. 30, 2015

(87) PCT Pub. No.: WO2014/104790
PCT Pub. Date: Jul. 3, 2014

(65) Prior Publication Data
US 2015/0336045 A1    Nov. 26, 2015

(30) Foreign Application Priority Data
Dec. 31, 2012    (KR) .................. 10-2012-0158447

(51) Int. Cl.
*B01D 53/14*    (2006.01)

(52) U.S. Cl.
CPC ..... *B01D 53/1475* (2013.01); *B01D 53/1493* (2013.01); *B01D 53/1425* (2013.01);
(Continued)

(58) Field of Classification Search
None
See application file for complete search history.

(56) References Cited

U.S. PATENT DOCUMENTS 5,463,130 A * 10/1995 Witzel .................. C07C 209/48
 544/404
5,618,506 A   4/1997 Suzuki et al. ................ 423/228
(Continued)

FOREIGN PATENT DOCUMENTS

JP    3197173    8/2001    ............ B01D 53/62
JP    3197183    8/2001    ............ B01D 53/62
(Continued)

OTHER PUBLICATIONS

International Search Report in PCT/KR2013/012268, dated Feb. 26, 2014 with English Translation.

*Primary Examiner* — Daniel Berns
(74) *Attorney, Agent, or Firm* — Harness, Dickey & Pierce, P.L.C.

(57) ABSTRACT

The present invention relates to a method for using, as a carbon dioxide absorbent, a secondary amine having a nitrile group, that is, a 3-(alkylamino)propionitrile compound. The absorbent based on the 3-(alkylamino)propionitrile compound and the carbon dioxide absorption method and separation method using same, according to the present invention, not only have an excellent carbon dioxide absorption capacity and a rapid carbon dioxide absorption rate, but also allow absorbent regeneration even at a considerably low temperature compared with a conventional alkanolamine-based absorbent and thus can significantly reduce the entire energy consumption required for an absorption process, and (Continued)

can also prevent recovered carbon dioxide from being contaminated with moisture and absorbent vapor, owing to the low regeneration temperature.

11 Claims, 1 Drawing Sheet

(52) U.S. Cl.
 CPC ......... *B01D 2252/2053* (2013.01); *B01D 2252/20426* (2013.01); *B01D 2252/20478* (2013.01); *B01D 2252/20484* (2013.01); *B01D 2252/502* (2013.01); *B01D 2252/504* (2013.01); *Y02C 10/04* (2013.01); *Y02C 10/06* (2013.01)

(56) References Cited

U.S. PATENT DOCUMENTS

| | | | |
|---|---|---|---|
| 6,364,938 B1 | 4/2002 | Birbara et al. | 95/139 |
| 6,755,892 B2 | 6/2004 | Nalette et al. | 95/11 |

FOREIGN PATENT DOCUMENTS

| | | | |
|---|---|---|---|
| JP | 2003-230812 | 8/2003 | B01D 53/62 |
| JP | 2009-213974 | 9/2009 | B01D 53/14 |
| WO | WO 2004/089512 | 10/2004 | B01D 53/14 |

\* cited by examiner

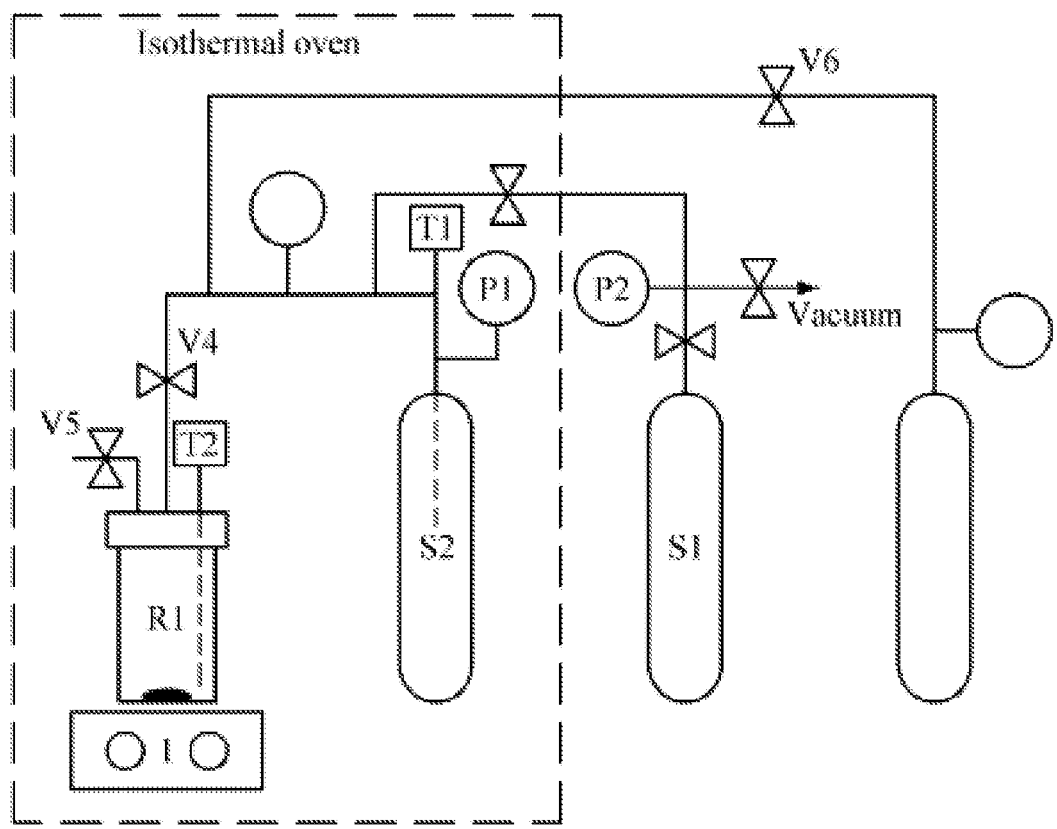

CARBON DIOXIDE ABSORBENT BASED ON AMINE HAVING NITRILE FUNCTIONAL GROUP, AND CARBON DIOXIDE ABSORPTION METHOD AND SEPARATION METHOD USING SAME

CROSS-REFERENCE TO RELATED APPLICATIONS

This application is a national phase application of PCT Application No. PCT/KR2013/012268, filed on 27 Dec. 2013, which claims benefit of Korean Patent Application 10-2012-0158447, filed on 31 Dec. 2012. The entire disclosure of the application identified in this paragraph is incorporated herein by reference.

TECHNICAL FIELD

The present invention relates to a method of using, as a carbon dioxide ($CO_2$) absorbent, a secondary amine having a nitrile group, i.e., 3-(alkylamino)propionitrile compound. More specifically, the present invention relates to a carbon dioxide absorbent based on an amine having a nitrile functional group, and a method of absorbing and separating carbon dioxide using the same, in which the $CO_2$ absorbent contains the 3-(alkylamino)propionitrile compound which is a novel amine compound having a nitrile group obtained by reacting a primary alkylamine or cycloalkylamine with acrylonitrile or methacrylonitrile.

BACKGROUND

Various methods such as absorption, adsorption, membrane separation, and cryogenic separation are used to separate carbon dioxide from exhaust gas of chemical plants, power plants or large-sized boilers and from natural gas. An absorption or adsorption method is widely used when the concentration of exhausted carbon dioxide is low.

The method is widely used since it can be selectively separate. A particular gas that can be well absorbed or adsorbed into an absorbent or adsorbent; however, since the adsorbent or adsorbent is chemically altered during the separation, it is necessary to periodically replace the absorbent or adsorbent. On the other hand, an absorption method in which a liquid absorbent is used is widely used in purification of a large amount of exhaust gas or used in gas separation since it is easy to replace the absorbent and absorb a greater absorption capacity; however, the liquid absorbent may be chemically or thermally altered.

As carbon dioxide absorbents, amine solutions such as monoethanolamine (MEA), N-methyldiethanolamine (MEDA), diethanolamine (DEA), etc., are widely used. It is because, when reacting with carbon dioxide, an alkanolamine absorbent is chemically combined to thereby form carbamate compounds, and then, when heat is applied to the alkanolamine absorbent, the carbamate compounds are separated such that the carbon dioxide can be stripped and recovered and the alkanolamine absorbent can be regenerated. However, the process has some serious drawbacks in that: absorption capacity degradation may be caused by irreversible formation and decomposition of amine compounds due to impurities, such as sulfur dioxide ($SO_2$), oxygen ($O_2$), and nitrogen oxide ($NO_x$), which are contained in a combustion exhaust gas, thereby causing corrosion of an absorption device; high thermal stability of carbamates formed by reaction with carbon dioxide requires a regeneration temperature to be 120° C. or higher, thereby causing excessive energy consumption (MEA requires 4.0 to 4.2 GJ per ton of carbon dioxide), excessive volatile loss of alkanolamine due to the high regeneration temperature (4 kg per ton in the case of using MEA), and replenishment of an absorbent; and carbon dioxide may be contaminated due to low vapor pressure of an absorbent during the regeneration process.

In order to resolve the drawbacks of the amine-based aqueous solvents, there have been reported various methods of physically absorbing carbon dioxide using organic solvents such as Selexol, IFPexol, NFM, etc. One important effect of the organic solvent absorbent is that a lower energy is required to recover carbon dioxide and recycle solvents since the absorption of carbon dioxide is achieved by a physical interaction between the solvent and carbon dioxide, not by the chemical bond as in the case of the aqueous amine absorbents. More specifically, in the case of using the amine absorbent, the recovery of carbon dioxide and the recycling of solvent require an energy-intensive, high-temperature stripping process; by contrast, in the case of the physical absorption. It is possible to recover carbon dioxide dissolved in the solvent by simply changing the pressure, not by increasing the temperature. However, the physical absorption method has some drawbacks in that in the case of separating carbon dioxide from a combustion gas having low pressure, the physical absorbents exhibit a carbon dioxide absorption capacity that is significantly lower than that of an aqueous amine solution, such that the circulation rate of the absorbent is high, thus requiring relatively large equipment. Accordingly, there is a need for the development of a novel chemical absorbent that has high thermal and chemical stability, and has low vapor pressure, so as to overcome the drawbacks of the general amine-based absorbents and organic solvent absorbents.

Recently, attempts have been made to reduce regeneration energy of chemical absorbents, including a method of using, as an absorbent, alkanolamine having steric hindrance around amine groups, and a typical example thereof is 2-amino-2-methyl-1-propanol (AMP) which is a primary amine. When reacting with carbon dioxide, AMP forms bicarbonate compounds that may be regenerated more readily than carbamates, thereby requiring 30% less regeneration energy compared to MEA; however, its $CO_2$ absorption rate is less than 50% of the absorption rate of MEA.

As a method of increasing the absorption rate of AMP, Mitsubishi Heavy Industries, Ltd. and Kansai Electric Power Co., Inc. made a joint effort to develop a novel absorbent prepared by adding piperazine, which is a secondary cycloamine, to AMP (Japanese Patent No. 3197173). However, in the method, an excessive amount of piperazine is used such that precipitation occurs after absorbing carbon dioxide, and when piperazine is reacted with carbon dioxide, stable carbamate compounds are formed in addition to bicarbonates, such that a regeneration process is difficult to perform.

Further, there is also known a method of using, as a $CO_2$ absorbent, alkali carbonate, such as sodium carbonate or potassium carbonate, instead of using a primary alkanolamine absorbent; however, the method has a problem of low $CO_2$ absorption rate. As a method of increasing a $CO_2$ absorption rate, WO2004-089512 A1 discloses a method of adding piperazine or its derivative to potassium carbonate in which a $CO_2$ absorption rate of potassium carbonate is significantly increased by; however, the method also has a drawback in that precipitation occurs when using potassium carbonate.

RELATED ART

Patent document 1: Japanese Patent No. 3197173.
Patent document 2: WO 2004/089512 A1.

TECHNICAL PROBLEM

An object of the present invention is to provide a carbon dioxide absorbent based on an amine having a nitrile functional group, and a method of absorbing and separating carbon dioxide using the same, in which the formation of carbamates having high thermal stability may be suppressed so that bicarbonates may be formed, or thermal stability of the formed carbamate compounds may be reduced significantly.

The above and other purposes and advantages of the invention will be more apparent from the following description of preferred exemplary embodiments.

TECHNICAL SOLUTION

The object of the present invention is achieved by a carbon dioxide ($CO_2$) absorbent based on an amine having a nitrile functional group, wherein the carbon dioxide absorbent contains a mixture of a 3-(alkylamino)propionitrile compound represented by the following Formula 3 and a secondary alkanolamine represented by the following Formula 4,

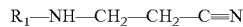  [Formula 3]

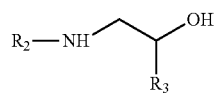  [Formula 4]

wherein $R_1$ represents a C1 to C6 alkyl group or a cycloalkyl group, $R_2$ represents a C1 to C6 alkyl group, and $R_3$ represents hydrogen or a methyl group.

In the carbon dioxide absorbent, an amount of the secondary alkanolamine, which is a rate enhancer represented by Formula 2, may be 20 to 150 parts by weight with respect to 100 parts by weight of the 3-(alkylamino)propionitrile compound used as a main absorbent.

Further, the object of the present invention is achieved by a method of absorbing carbon dioxide, the method comprising absorbing carbon dioxide by using the carbon dioxide absorbent based on an amine having a nitrile functional group of claim 1 or 2, the carbon dioxide absorbent being dissolved in water or in an organic solvent.

The organic solvent may be at least one selected from a group consisting of a C1 to C6 alcohol, such as methanol, ethanol, propanol, butanol, hexanol, ethylene glycol, 2-methoxyethanol, 2-(2-methoxyethoxy)ethanol, and the like, an amide compound such as N,N-dimethylformamide (DMF), N,N-dimethylacetamide (DMAc), and the like, a ketone compound such as methylethylketone (MEK), methylisobutylketone (MIBK), benzophenone, and the like, dimethyl sulfoxide (DMSO), N-methylpyrrolidinone (NMP), and sulfolane.

An amount of the mixture of the 3-(alkylamino)propionitrile compound and the secondary alkanolamine may be preferably 10 to 150 parts by weight with respect to 100 parts by weight of the solvent.

In addition, the object of the present invention is achieved by a method of separating carbon dioxide, the method including: a first step of absorbing carbon dioxide from a gas mixture containing carbon dioxide by using a carbon dioxide absorbent based on an amine having a nitrile functional group of claim 1 or claim 2; and a second step of separating carbon dioxide absorbed by the carbon dioxide absorbent based on an amine having a nitrile functional group.

Temperature of the absorption in the first step may be 20° C. to 60° C.

Pressure of the absorption in the first step may be preferably normal pressure to 30 atmosphere.

Temperature of the separation in the second step may be preferably 70° C. to 120° C.

Pressure of the separation in the second step may be preferably normal pressure.

ADVANTAGEOUS EFFECTS

According to the present invention, the carbon dioxide absorbent has high carbon dioxide absorption capability as well as a high absorption rate, and has a significantly low regeneration temperature as compared to a general absorbent, thereby significantly reducing the entire energy consumption required for an absorption process, and almost maintaining initial absorption capability even when absorption and separation of carbon dioxide are repeated.

DRAWINGS

FIG. 1 is a schematic view illustrating an example of a device for carbon dioxide absorption and separation experiments.

MODE FOR INVENTION

Hereinafter, the invention is described more fully with reference to illustrative embodiments and the accompanying drawings. However, it is understood that the embodiments are merely illustrative for explanation of the present invention, and the scope of the present invention is not limited thereto.

In order to solve the problems of general carbon dioxide absorbents, inventors of the present invention have conducted research on an absorption and regeneration mechanism, and found out that by reacting a primary amine and a secondary amine with carbon dioxide, carbamates, bicarbonates, or a mixture thereof may be formed depending on the structure of amine compounds; and as more carbamates are formed, an absorption rate gets higher, and as more bicarbonates are formed, regeneration efficiency is increased.

Based on the research, the inventors of the present invention have concluded that the problems of the general amine-based absorbents are mostly caused by a high regeneration temperature of absorbents, and have made efforts to develop an absorbent which may be regenerated even at a low temperature and exhibits excellent absorption capacity.

The present invention may provide a method of significantly reducing energy consumption required to regenerate an absorbent, as compared to a general alkanolamine-based or alkali-carbonate-based carbon dioxide absorbent, in which the method of the present invention uses a 3-(alkylamino)propionitrile compound, which is an amine compound having a nitrile group and is represented by the following Formula 3, as a carbon dioxide absorbent alone or in combination with a secondary alkanolamine that is a rate enhancer and is represented by the following Formula 4, the 3-(alkylamino)propionitrile compound being produced by reacting a primary alkylamine represented by the following Formula 1 with acrylonitrile or meta-acrylonitrile represented by the following Formula 2. A nitrile group having a high electron-attracting effect is present in the 3-(alkylamino)propionitrile compound, such that basicity of the 3-(alkylamino)propionitrile compound may be substantially reduced as compared to the basicity of alkanolamine such as ethanolamine, thereby weakening an interaction force between an amino group of the 3-(alkylamino)propionitrile compound and carbon dioxide. As a result, thermal stability of a compound formed by reaction with carbon dioxide is reduced, thereby facilitating regeneration of an absorbent.

[Formula 1]

[Formula 2]

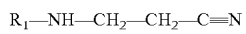
[Formula 3]

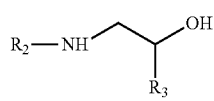
[Formula 4]

Examples of a $C_1$ to $C_6$ alkyl group or cycloalkyl group represented by $R_1$ in the above Formulae 1 to 3 include, but are not limited to, n-propyl, i-propyl, n-butyl, i-butyl, t-butyl, n-amyl, i-amyl, t-amyl, n-hexyl, 2-hexyl, cyclohexyl, methylcyclohexyl, n-heptyl, n-octyl, and the like.

Further, in the above Formula 4, $R_2$ represents $C_1$ to $C_6$ alkyl group, and examples thereof include, but are not limited to, methyl, ethyl, n-propyl, n-butyl, n-amyl, n-hexyl, and the like. $R_3$ is hydrogen or a methyl group.

In the case where a secondary alkanolamine is used as a rate enhancer, the amount of the secondary alkanolamine may be preferably 20 to 150 parts by weight, and more preferably 30 to 100 parts by weight with respect to 100 parts by weight of the 3-(alkylamino)propionitrile compound used as a main absorbent. In the case where the amount of the secondary alkanolamine is less than 20 parts by weight with respect to the weight of the 3-(alkylamino)propionitrile compound, the effect of enhancing the $CO_2$ absorption rate is significantly reduced, and in the case where the amount of the secondary alkanolamine is greater than 150 parts by weight with respect to the weight of the 3-(alkylamino)propionitrile compound, a $CO_2$ absorption regeneration rate is significantly reduced with only a slight increase in the $CO_2$ absorption rate.

Further, according to the present invention, the absorbent based on the 3-(alkylamino)propionitrile compound may absorb carbon dioxide even without a solvent, but when considering an absorption capability and viscosity of an absorbent, it is preferable to dissolve the absorbent based on the 3-(alkylamino)propionitrile compound in water or in an organic solvent, so as to use the absorbent to absorb carbon dioxide.

The absorbent based on the 3-(alkylamino)propionitrile compound has substantially different water solubility depending on the length of an alkyl group represented by $R_1$ in Formula 3, and particularly in the case where $R_1$ is an alkyl group having 6 or higher carbon atoms, the absorbent is almost insoluble in water.

According to the present invention, examples of the organic solvent include, but are not limited to polar organic solvents containing a C1 to C6 alcohol, such as methanol, ethanol, propanol, butanol, hexanol, ethylene glycol, 2-methoxyethanol, 2-(2-methoxyethoxy)ethanol, and the like, an amide compound such as N, N-dimethylformamide (DMF), N, N-dimethylacetamide (DMAc), and the like, a ketone compound such as methylethylketone (MEK), methylisobutylketone (MIBK), benzophenone, and the like.

In the case of using the 3-(alkylamino)propionitrile compound by dissolving the compound in water or in an organic solvent, the amount of the amine compound may be preferably 10 to 150 parts by weight, and more preferably 30 to 120 parts by weight with respect to 100 parts by weight of a solvent. In the case where the total amount of the amine compound is less than 10 parts by weight, a carbon dioxide absorption capability is significantly reduced. In the case where the total amount of the amine compound is greater than 150 parts by weight, viscosity of a solution after absorbing carbon dioxide is excessively increased with only a slight increase in the $CO_2$ absorption rate and amount.

Further, as illustrated in the following Reaction Equation 1, the $CO_2$ absorbent based on the 3-(alkylamino)propionitrile compound, which is used with no solvent or used by being dissolved in an organic solvent to react with $CO_2$, forms a carbamic acid that has much lower thermal stability than a carbamate compound which has high thermal stability and is formed when using a general alkanolamine. Further, as illustrated in the following Reaction Equation 2, even in the case of using water as a solvent, a bicarbonate ($HCO_3$) compound that may be easily regenerated is formed, such that energy required for the regeneration may be significantly reduced as compared to a general alkanolamine absorbent.

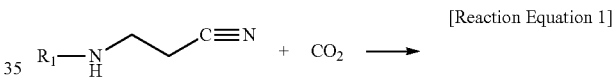
[Reaction Equation 1]

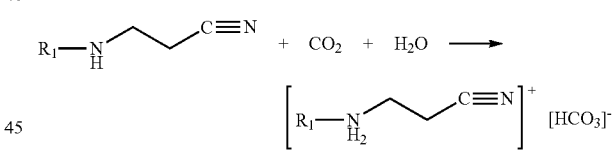
[Reaction Equation 2]

Accordingly, by using the absorbent according to the present invention, carbamates may not be formed even after $CO_2$ is absorbed, such that an absorbent may be regenerated even at a low temperature, thereby reducing the entire energy required for an absorption process, and solving problems of corrosion and absorbent loss caused at a high regeneration temperature.

In addition, unlike the case where carbamates are formed by reaction of primary and secondary alkanolamines, which are not sterically hindered, with carbon dioxide at a ratio of 2:1, the absorbent based on the 3-(alkylamino)propionitrile compound according to the present invention reacts with carbon dioxide at a ratio of 1:1 (mol $CO_2$/mol alkanolamine=1/1), such that the absorbent may absorb two times more $CO_2$ per molar unit than general alkanolamine such as monoethanolamine (MEA), and accordingly, is economical since a circulated amount of an absorbent may be reduced, which reduces the size of an absorption device.

Further, according to the present invention, a method of separating $CO_2$ from a gas mixture containing $CO_2$ by using the above-described $CO_2$ absorbent includes: a first step of absorbing $CO_2$ in a gas mixture containing $CO_2$ by using the $CO_2$ absorbent based on an amine having a nitrile functional group; and a second step of separating the absorbed $CO_2$ from the $CO_2$ absorbent based on an amine having a nitrile functional group.

Examples of the gas mixture containing $CO_2$ include exhaust gases, natural gases, and the like that are discharged from chemical plants, power plants, and large boilers.

When $CO_2$ is absorbed in the first step, the absorption temperature may be preferably in the range of 10° C. to 80° C., and more preferably in the range of 20° C. to 60° C.; and the pressure may be preferably in the range of normal pressure to 50 atmosphere, and more preferably in the range of atmospheric pressure to 30 atmosphere. In the case where the absorption temperature is above 60° C., separation is performed at the same time as the absorption such that the absorbed amount of $CO_2$ is reduced, whereas in the case where the absorption temperature is below 10° C., additional refrigeration equipment is required, thereby causing economic inefficiency. Further, an exhaust gas has normal pressure, such that it is most economical to perform absorption at normal pressure. In the case where an absorption pressure is above 30 atmosphere, although an absorbed amount is increased, additional equipment, i.e., a compressor, is needed to increase the pressure, thereby resulting in economic inefficiency.

When the absorbed $CO_2$ is separated in the second step, the temperature may be preferably in the range of 60° C. to 140° C., and more preferably in the range of 70° C. to 120° C., and the pressure may be preferably normal pressure. In the case where the separation temperature is below 70° C., separation may not be performed, whereas in the case where the separation temperature is above 120° C., the condition is the same as in the case of using an MEA absorbent, such that the effects of the ternary absorbent according to the present invention may not be achieved. Further, it is difficult to perform separation at a high pressure, since a vapor pressure of water is required to be significantly increased to maintain such high pressure, thereby requiring high temperature, and resulting in economic inefficiency. Accordingly, separation is preferably performed at normal pressure.

Among the terms used throughout the present invention, the term "normal pressure" refers to atmospheric pressure, i.e., 1 atmosphere.

Hereinafter, configurations and effects of the present invention will be described in detail with respect to specific examples and comparative examples; however, these examples are merely illustrative to make the present invention better understood and do not limit the scope of the present invention.

First, experiments on the $CO_2$ absorption capacity were conducted by using the device for carbon dioxide absorption and separation experiments illustrated in FIG. 1. The device illustrated in FIG. 1 includes a 60 ml stainless steel absorption reactor R1 equipped with a thermometer T2, a high-pressure transducer P1 (0 to 70 atm), a 75 ml $CO_2$ storage cylinder S2 equipped with a thermometer T1, and a stirrer 1, and is installed in an isothermal oven to measure the carbon dioxide absorption capacity at a constant temperature. Further, a $CO_2$ supply cylinder S1 and a manometer P2 are installed on the outside of the isothermal oven.

After weighing the entire weight of the stainless steel absorption reactor R1 into which a certain amount of absorbent was put along with a magnet bar, the absorption reactor was stirred at 40° C. to 80° C. for one hour to be dried under vacuum, and the temperature was reduced to 40° C. so that the absorption reactor and the isothermal oven were maintained at a constant temperature. After turning off a valve V4 connected to the stainless steel absorption reactor R1, carbon dioxide at a constant pressure (e.g., 10 to 50 atm) was put into the $CO_2$ storage cylinder S2, and the pressure and temperature in equilibrium were recorded. Then, after the stirring of the absorption reactor R1 was stopped, the pressure of the absorption reactor R1 was maintained at a constant pressure by using the valve V4 and a pressure regulator, and the pressure and temperature of the $CO_2$ storage cylinder S2 maintained in equilibrium were recorded, and then the $CO_2$ storage cylinder S2 was stirred. After one hour, the final pressure and temperature were recorded (equilibrium values), and a change in the weight of the absorption reactor R1 was measured.

During a separation test, after turning off the valve V4, and increasing the temperature of the absorption reactor R1 to 70° C. to 120° C., the valve V4, a valve V5, and a valve V6 were turned on, and 20 ml/min of nitrogen was introduced to the absorption reactor R1 to separate carbon dioxide, and then, the temperature was reduced to room temperature, and a change in the weight of the absorption reactor R1 before and after the separation was measured.

Examples 1 to 8

Carbon dioxide absorption tests were performed in the following manner: after filling the absorption reactor R1 illustrated in FIG. 1 with 20 g of an absorbent containing 3-(alkylamino)propionitrile compound used as a main absorbent alone or in combination with 2(alkylamino)ethanol as a rate enhancer, the temperature of the isothermal oven was maintained at 40° C. After stirring of the absorption reactor R1 was stopped, the pressure was maintained at 1 atm by using the valve V4 and a pressure regulator, and the pressure of the $CO_2$ storage cylinder S2 maintained in equilibrium was recorded, and then the stirring was resumed. After one hour, the final pressure and weight were measured to obtain amounts of $CO_2$ absorbed per mole of amine, and the results are shown in Table 1 below.

TABLE 1

| Example | Absorbent component | | $CO_2$ absorption capability (mol $CO_2$/mol amine) |
|---|---|---|---|
| 1 | 3-(methylamino)propionitrile | — | 0.68 |
| 2 | 3-(ethylamino)propionitrile | 2-(methylamino)ethanol | 1.01 |
| 3 | 2-methyl-3-(isopropylamino)propionitrile | 2 (butylamino)ethanol | 1.01 |
| 4 | 3-(butylamino)propionitrile | 1-methyl-2-(ethylamino)ethanol | 1.02 |

TABLE 1-continued

| Example | Absorbent component | | $CO_2$ absorption capability (mol $CO_2$/mol amine) |
|---|---|---|---|
| 5 | 2-methyl-3-(amylamino)propionitrile | 1-methyl-2-(butylamino)ethanol | 0.97 |
| 6 | 2-methyl-3-(hexylamino)propionitrile | 2-(pentylamino)ethanol | 0.94 |
| 7 | 3-(octylamino)propionitrile | 2-(hexylamino)ethanol | 0.94 |
| 8 | 3-(cyclohexylamino)propionitrile | 1-methyl-2-(propylamino)ethanol | 0.95 |

Examples 9 to 17

Carbon dioxide absorption tests were performed in the following manner: after filling the absorption reactor R1 illustrated in FIG. 1 with 30 g of an absorbent solution obtained by dissolving, in water or in an organic solvent, 35% by weight of an amine compound containing 70% by weight of 3-(alkylamino)propionitrile as a main absorbent and 30% by weight of 2(alkylamino)ethanol as a rate enhancer, the temperature of the absorption reactor R1 was maintained at 40° C. After stirring of the absorption reactor R1 was stopped, the pressure of the absorption reactor R1 was maintained at 1 atm by using the valve V4 and a pressure regulator, and the pressure of the $CO_2$ storage cylinder S2 maintained in equilibrium was recorded, and then the stirring was resumed. After one hour, the final pressure and weight were measured to obtain amounts of $CO_2$ absorbed per mole of amine, and the results are shown in Table 2 below.

TABLE 2

| Example | Type of absorbent | | Type of solvent | $CO_2$ absorption capability (mol $CO_2$/mol amine) |
|---|---|---|---|---|
| | Main absorbent | Rate enhancer | | |
| 9 | 3-(ethylamino)propionitrile | — | Water | 0.69 |
| 10 | 3-(ethylamino)propionitrile | 2-(methylamino)ethanol | Water | 1.03 |
| 11 | 3-(ethylamino)propionitrile | 2-(methylamino)ethanol | Methanol | 1.11 |
| 12 | 2-methyl-3-(isopropylamino)propionitrile | 2-(butylamino)ethanol | Ethanol | 1.02 |
| 13 | 3-(butylamino)propionitrile | 1-methyl-2-(ethylamino)ethanol | DMF | 0.96 |
| 14 | 2-methyl-3-(amylamino)propionitrile | 1-methyl-2-(butylamino)ethanol | NMP | 0.94 |
| 15 | 2-methyl-3-(hexylamino)propionitrile | 2-(pentylamino)ethanol | MIBK | 0.89 |
| 16 | 3-(octylamino)propionitrile | 2-(hexylamino)ethanol | Sulfolane | 0.91 |
| 17 | 3-(cyclohexylamino)propionitrile | 1-methyl-2-(propylamino)ethanol | DMAc | 0.97 |

Examples 18 to 22

Carbon dioxide absorption tests were performed in the same manner as in Example 1: by using a methanol solution obtained by dissolving 35% by weight of an amine compound containing 70% by weight of 3-(butylamino)propionitrile as a main absorbent and 30% by weight of 2(butylamino)ethanol as a rate enhancer; and by varying the absorption temperature while fixing the $CO_2$ pressure at 1 atm. The results are shown in Table 3 below.

TABLE 3

| Example | Absorption temperature (° C.) | $CO_2$ absorption capability (moll $CO_2$/mol amine) |
|---|---|---|
| 18 | 20 | 1.14 |
| 19 | 30 | 1.10 |
| 20 | 40 | 1.03 |
| 21 | 50 | 0.84 |
| 22 | 60 | 0.56 |

Examples 23 to 35

Carbon dioxide absorption tests were performed in the same manner as in Example 1: by using an absorbent solution obtained by dissolving, in 65% by weight of an organic solvent, 35% by weight of an amine compound containing 70% by weight of 3-(butylamino)propionitrile as a main absorbent and 30% by weight of 2(butylamino)ethanol as a rate enhancer; and by varying the types of the organic solvent while fixing the $CO_2$ pressure at 1 atm and the absorption temperature at 40° C. The results are shown in Table 4 below.

TABLE 4

| Example | Organic solvent | $CO_2$ absorption capability (mol $CO_2$/mol amine) |
|---|---|---|
| 23 | Ethanol | 0.97 |
| 24 | Propanol | 0.95 |
| 25 | Butanol | 0.89 |
| 26 | Hexanol | 0.84 |
| 27 | Ethylene glycol | 1.01 |
| 28 | 2-methoxyethanol | 0.99 |
| 29 | 2-(2-methoxyethoxy)ethanol | 0.96 |
| 30 | DMF | 0.83 |
| 31 | DMSO | 0.83 |
| 32 | NMP | 0.86 |
| 33 | Sulfolane | 0.87 |
| 34 | MEK | 0.80 |
| 35 | DMAc | 0.85 |

Examples 36 to 40

Carbon dioxide absorption tests were performed in the same manner as in Example 1: by using a methanol solution obtained by dissolving 35% by weight of an amine compound containing 70% by weight of 3-(butylamino)propionitrile as a main absorbent and 30% by weight of 2(butylamino)ethanol as a rate enhancer; and by varying the absorption pressure while fixing the temperature at 40° C. The results are shown in Table 5 below.

TABLE 5

| Example | Absorption pressure (atm) | $CO_2$ absorption capability (mol $CO_2$/mol amine) |
|---|---|---|
| 36 | Normal pressure | 0.99 |
| 37 | 5 | 1.23 |
| 38 | 10 | 1.34 |
| 39 | 20 | 1.56 |
| 40 | 30 | 1.87 |

Examples 41 to 46

Carbon dioxide absorption tests were performed in the same manner as in Example 1: by using, as an absorbent, an aqueous solution obtained by dissolving, in water, 3-(butylamino)propionitrile as a main absorbent and 2(butylamino)ethanol as a rate enhancer at a weight ratio of 7:3; and by varying a total amount of amine with respect to the weight of water while fixing the temperature at 40° C. and the pressure at 1 atm. The results are shown in Table 6 below. As the amount of amine was increased, the amount of $CO_2$ absorbed per mole of amine was reduced. The reason for this is considered that an increased amount of amine leads to an increase in the viscosity of an absorbent solution, thereby limiting delivery of materials.

TABLE 6

| Example | Amine/water (wt %) | $CO_2$ absorption capability (mol $CO_2$/mol amine) |
|---|---|---|
| 41 | 20 | 1.01 |
| 42 | 40 | 1.00 |
| 43 | 50 | 0.98 |
| 44 | 60 | 0.93 |
| 45 | 80 | 0.89 |
| 46 | 100 | 0.83 |

Examples 47 to 52

Carbon dioxide absorption tests were performed in the same manner as in Example 9: by using, as an absorbent, an aqueous solution obtained by dissolving, in water, 35% by weight of an amine containing 70% by weight of 3-(butylamino)propionitrile as a main absorbent and 30% by weight of 2(butylamino)ethanol as a rate enhancer; and by varying the composition (wt %) of the main absorbent and the rate enhancer while fixing the $CO_2$ pressure at 1 atm and the absorption temperature at 40° C. The results are shown in Table 7 below.

TABLE 7

| Example | Rate enhancer/main absorbent (wt %) | $CO_2$ absorption capability (mol $CO_2$/mol amine) | Absorption rate of $CO_2$ during the initial 10 min. period (g $CO_2$/Kg absorbent-min) |
|---|---|---|---|
| 47 | 20 | 1.03 | 91.5 |
| 48 | 40 | 0.98 | 97.9 |
| 49 | 60 | 0.94 | 104.5 |
| 50 | 80 | 0.89 | 108.1 |
| 51 | 100 | 0.82 | 114.4 |
| 52 | 150 | 0.79 | 114.5 |

Examples 53 to 60

Carbon dioxide absorption tests were performed in the same manner as in Example 9: by using, as an absorbent, an aqueous solution obtained by dissolving, in water, 35% by weight of an amine containing 3-(butylamino)propionitrile as a main absorbent and 2(butylamino)ethanol as a rate enhancer at a weight ratio of 7:3; and by fixing an absorption temperature at 40° C. and an absorption pressure at 1 atm. After measuring $CO_2$ amounts absorbed during the $CO_2$ absorption tests, separation tests were performed by introducing nitrogen at the rate of 20 ml/min. Upon completion of the first absorption and separation of carbon dioxide, $CO_2$ absorption and separation processes were repeated five times under the same conditions. The comparison results between the first absorption capacity and the fifth absorption capacity are shown in Table 8 below.

TABLE 8

| | | | | $CO_2$ absorption capability (mol $CO_2$/mol amine) | |
|---|---|---|---|---|---|
| Example | Main absorbent | Rate enhancer | Separation temperature (° C.) | First absorption | Fifth absorption |
| 53 | 3-(ethylamino)propionitrile | 2-(methylamino)ethanol | 100 | 1.03 | 0.94 |

TABLE 8-continued

| Example | Main absorbent | Rate enhancer | Separation temperature (° C.) | CO$_2$ absorption capability (mol CO$_2$/mol amine) | |
|---|---|---|---|---|---|
| | | | | First absorption | Fifth absorption |
| 54 | 3-(butylamino)propionitrile | 2-(butylamino)ethanol | 100 | 1.01 | 1.00 |
| 55 | 2-methyl-3-(hexylamino)propionitrile | 2-(ethylamino)ethanol | 100 | 1.00 | 0.98 |
| 56 | 2-methyl-3-(hexylamino)propionitrile | 1-methyl-2-(butylamino)ethanol | 100 | 1.02 | 1.01 |
| 57 | 3-(octylamino)propionitrile | 2-(ethylamino)ethanol | 100 | 0.97 | 0.95 |
| 58 | 3-(cyclohexylamino)propionitrile | 1-methyl-2-(propylamino)ethanol | 120 | 1.02 | 1.02 |
| 59 | 3-(butylamino)propionitrile | 2-(butylamino)ethanol | 90 | 1.01 | 0.98 |
| 60 | 3-(butylamino)propionitrile | 2-(butylamino)ethanol | 70 | 1.01 | 0.76 |

Comparative Example

The separation test was performed five times in the same manner as in Example 53. After absorbing carbon dioxide at 1 atm and at 40° C. by using an aqueous solution containing 35% by weight of monoethanolamine (MEA) as an absorbent, the absorbed carbon dioxide was separated at normal pressure and at 100° C.

During the first absorption, 0.62 mol of carbon dioxide per mole of monoethanolamine was absorbed into the absorbent; however, during the fifth absorption, 0.24 mol of carbon dioxide per mole of monoethanolamine was absorbed into the absorbent, which resulted in about 63.0% reduction in the absorption capability of the absorbent.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A carbon dioxide (CO$_2$) absorbent based on an amine having a nitrile functional group, wherein the carbon dioxide absorbent consists essentially of a mixture of a 3-(alkylamino)propionitrile compound represented by Formula 3 and a secondary alkanolamine represented by Formula 4,

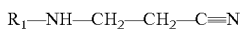

R$_1$—NH—CH$_2$—CH$_2$—C≡N    Formula 3,

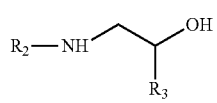

Formula 4 wherein R$_1$ represents a C1 to C6 alkyl group or a cycloalkyl group, R$_2$ represents a C1 to C6 alkyl group, and R$_3$ represents hydrogen or a methyl group.

2. The carbon dioxide absorbent of claim 1, wherein an amount of the secondary alkanolamine is 20 to 150 parts by weight with respect to 100 parts by weight of the 3-(alkylamino)propionitrile compound used as a main absorbent.

3. A method of absorbing carbon dioxide, the method comprising absorbing carbon dioxide by using the carbon dioxide absorbent of claim 1, the carbon dioxide absorbent being dissolved in water or in an organic solvent.

4. The method of claim 3, wherein the organic solvent is at least one selected from the group consisting of a C1 to C6 alcohol, an amide compound, a ketone compound, dimethyl sulfoxide (DMSO), N-methylpyrrolidinone (NMP), and sulfolane.

5. The method of claim 3, wherein an amount of the mixture of the 3-(alkylamino)propionitrile compound and the secondary alkanolamine is 10 to 150 parts by weight with respect to 100 parts by weight of the solvent.

6. A method of separating carbon dioxide, the method comprising: a first step of absorbing carbon dioxide from a gas mixture containing carbon dioxide by using the carbon dioxide absorbent of claim 1; and a second step of separating carbon dioxide absorbed by the carbon dioxide absorbent.

7. The method of claim 6, wherein a temperature of the absorption in the first step is 20° C. to 60° C.

8. The method of claim 6, wherein a pressure of the absorption in the first step is normal pressure to 30 atmospheres.

9. The method of claim 6, wherein a temperature of the separation in the second step is 70° C. to 120° C.

10. The method of claim 6, wherein a pressure of the separation in the second step is normal pressure.

11. The method of claim 6, wherein a temperature of the absorption in the first step is 20° C. to 60° C., wherein a pressure of the absorption in the first step is normal pressure to 30 atmospheres, wherein a temperature of the separation in the second step is 70° C. to 120° C., and wherein a pressure of the separation in the second step is normal pressure.

* * * * *